(12) United States Patent
Ghannam et al.

(10) Patent No.: US 11,066,005 B2
(45) Date of Patent: Jul. 20, 2021

(54) SYSTEM AND METHOD FOR PROVIDING DYNAMIC HIGH BEAM CONTROL

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 16/259,275

(22) Filed: Jan. 28, 2019

(65) Prior Publication Data
US 2020/0238894 A1     Jul. 30, 2020

(51) Int. Cl.
*B60Q 1/08*     (2006.01)
*G03B 21/20*    (2006.01)

(52) U.S. Cl.
CPC ......... *B60Q 1/085* (2013.01); *G03B 21/2053* (2013.01); *B60Q 2300/056* (2013.01); *B60Q 2300/45* (2013.01)

(58) Field of Classification Search
CPC .... B60Q 1/085; B60Q 1/04; B60Q 2300/056; B60Q 2300/45; G03B 21/20; G03B 21/2053

USPC .......................................................... 701/49
See application file for complete search history.

(56) References Cited

U.S. PATENT DOCUMENTS

| 10,611,293 | B2* | 4/2020  | Park ..................... B60Q 1/143 |
| 2013/0343071 | A1* | 12/2013 | Nagaoka .............. B60Q 9/008 362/466 |
| 2016/0114720 | A1  | 4/2016  | Schlaug et al. |
| 2017/0120801 | A1* | 5/2017  | Asaoka ................. H05B 45/12 |
| 2018/0255622 | A1  | 9/2018  | Spero |

FOREIGN PATENT DOCUMENTS

| JP | 2005329819 A    | 12/2005 |
| JP | 5831302 B2      | 12/2015 |
| WO | WO 2018079408 A1 | 5/2018 |

* cited by examiner

*Primary Examiner* — Rachid Bendidi
*Assistant Examiner* — Michael R Smith
(74) *Attorney, Agent, or Firm* — Frank Lollo; Eversheds Sutherland (US) LLP

(57) ABSTRACT

A dynamic high beam control system includes sensors, high beam headlamps including light pixels, and processors. The processors determine, via the sensors, a direction in which a person is facing. In response to determining that the person is facing the vehicle, the processors determine, via the sensors, a position of the person's face and adjust at least one of the light pixels projecting light to the person's face based on the position.

22 Claims, 4 Drawing Sheets

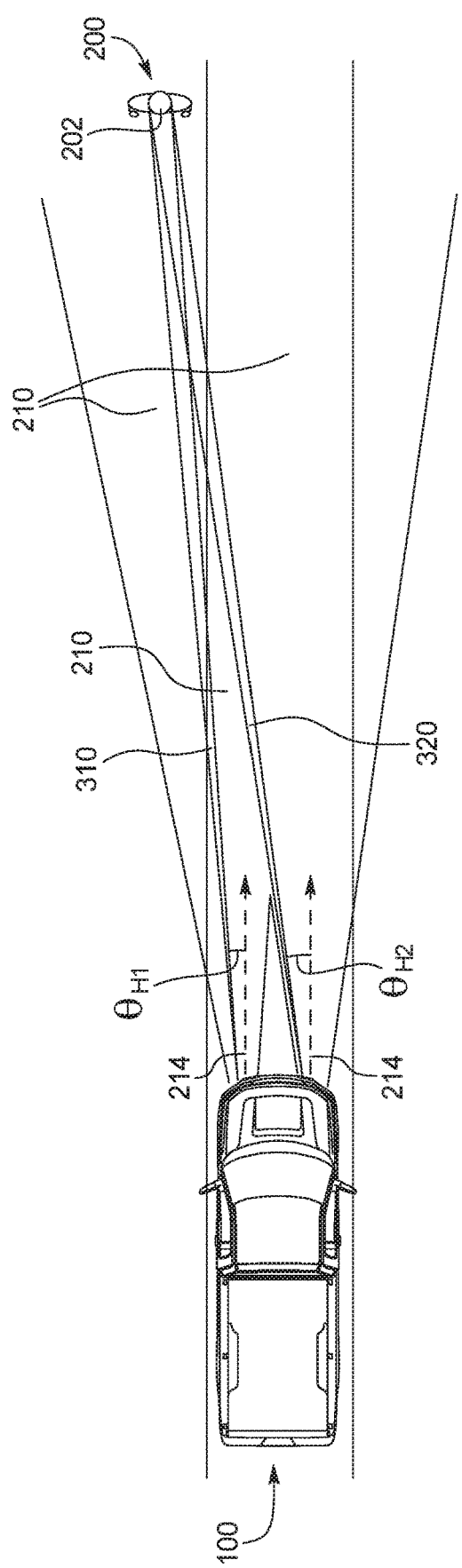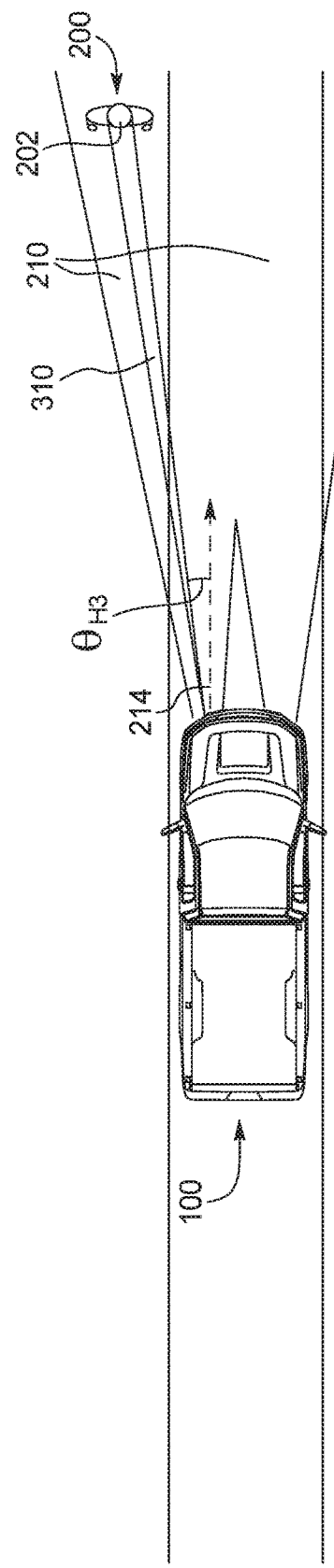
FIG. 3A
FIG. 3B

SYSTEM AND METHOD FOR PROVIDING DYNAMIC HIGH BEAM CONTROL

TECHNICAL FIELD

The present disclosure generally relates to a system and method for providing dynamic high beam control and, more specifically, a system and method for providing dynamic high beam control to mitigate dazzling effect caused by high beams.

BACKGROUND

High beams generated from a vehicle enable a driver to see further down a driving path in environments lacking ambient light. Since the intensity of high beams are generally greater than that of standard vehicle head lights, pedestrians facing the vehicle may experience discomfort.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle and method are disclosed. The example vehicle includes sensors, high beam headlamps comprising light pixels, and processors. The processors are configured to: determine, via the sensors, a direction in which a person is facing; and responsive to determining that the person is facing the vehicle: determine, via the sensors, a position of the person's face; and based on the position, adjust at least one of the light pixels projecting light to the person's face.

The example method is a method of controlling high beams generated from a vehicle. The method includes: determining, via sensors, a direction in which a person is facing; and responsive to determining that the person is facing the vehicle: determining, via the sensors, a position of the person's face; and based on the position, adjust at least one of light pixels of high beam headlamps projecting light to the person's face.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3A and 3B illustrate a plan view of the example scenarios as illustrated in FIGS. 2A and 2B, respectively.

DETAILED DESCRIPTION OF EXAMPLE EMBODIMENTS

Figure 1:
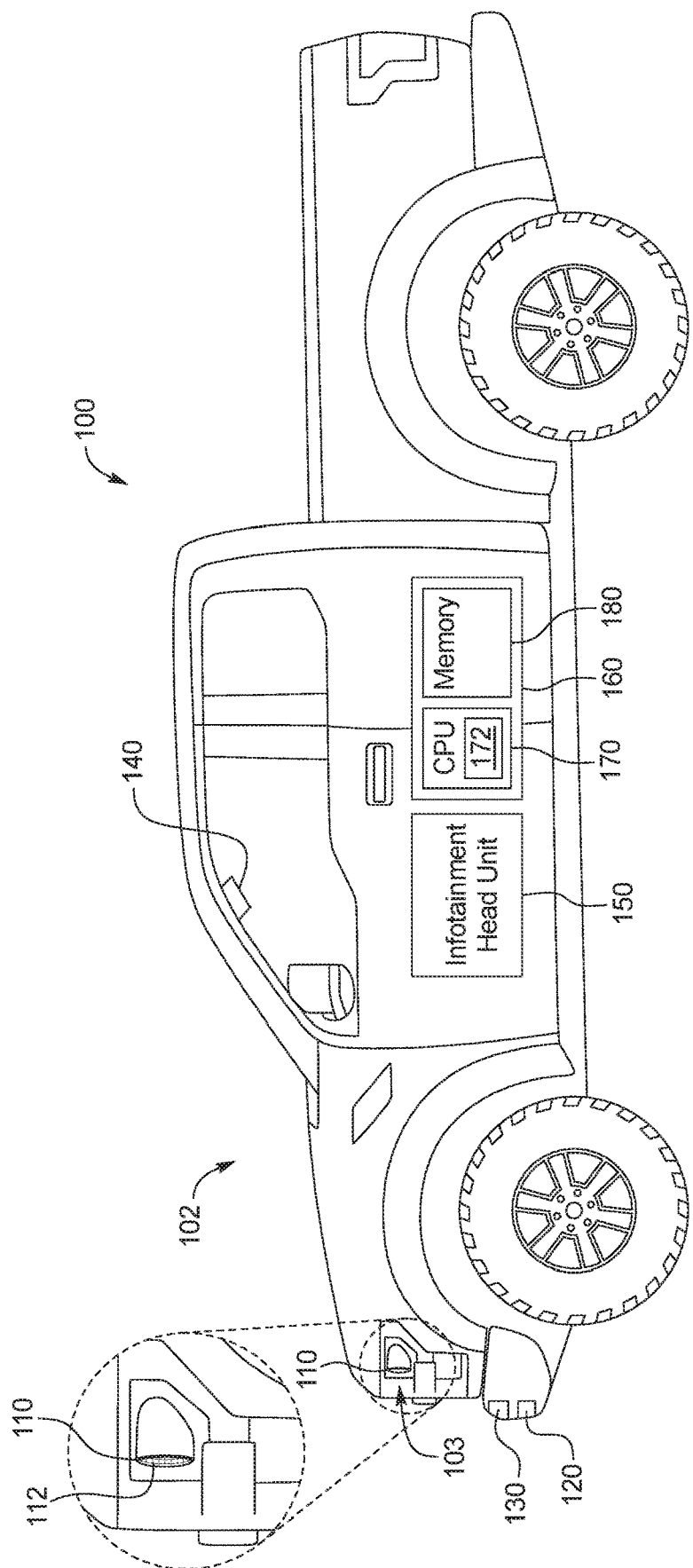
FIG. 1 illustrates a vehicle in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include a headlight system for providing light to the road ahead. The headlight system typically includes headlamps providing high beams for enabling drivers to see further down a driving path in environments lacking ambient light (e.g., rural areas, mountain roads, tunnels, etc.). While the high beams facilitate drivers maneuvering vehicles in said environments, pedestrians facing a direction in which the high beams are projected may be dazzled and experience discomfort due to the light intensity thereof, Thus, there is a need for mitigating the dazzling effect of high beams projected on pedestrians while maintaining visual clarity in environments lacking ambient light.

As disclosed below, a vehicle includes a dynamic high beam control system for dynamically adjusting at least one pixel of high beam headlamps based on a heading of a pedestrian. As the vehicle traverses a driving path, the dynamic high beam control system dynamically adjusts one or more pixels of the high beam headlamps such that a portion of the high beams is prevented from being projected on to the pedestrian's face. The dynamic high beam control system includes at least one external sensor and/or camera, a processor, and high beam headlamps. Said external sensor and/or camera generates data by sensing and capturing images of a pedestrian. Based on the data, the processor determines whether the pedestrian is facing a direction in which the vehicle is approaching. If the pedestrian is facing the direction in which the vehicle is approaching the processor causes one or more pixels of the high beam headlamps to deactivate such that one or more portions of the high beams is prevented from being projected on to the pedestrian's face.

FIG. 1 illustrates a vehicle 100 in accordance with this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be a semi-autonomous vehicle (e.g., some routine motive functions, such as parking, are controlled by the vehicle 100), or an autonomous vehicle (e.g., motive functions are controlled by the vehicle 100 without direct driver input). In this illustrated example, the vehicle 100 includes a dynamic high beam control system.

The dynamic high beam control system includes high beam headlamps 110, external sensors 120, an external camera 130, an internal camera 140, an infotainment head unit 150, and an on-board computing platform 160. The high beam headlamps 110, the external sensors 120, the external camera 130, the internal camera 140, the infotainment head unit 150, and the on-board computing platform 160 may be communicatively coupled to each other via at least one bus (not illustrated) and/or via a wireless system (not illustrated).

The high beam headlamps 110 are positioned at the front side 102 of the vehicle, Each of the high beam headlamps 110 may be disposed within a vehicle head light 103, In some examples, the high beam headlamp 110 may be separately positioned from the vehicle head light 103, In some examples, each of the high beam headlamps 110 may include a plurality of light pixels 112, In such examples, each of the plurality of light pixels 112 may independently generate its own beam of light. The plurality of light beams generated from the plurality of light pixels 112 may form a single high beam, One or more of the plurality of light pixels 112 may be deactivated such one or more portions of the high beam may be absent of light. It should be appreciated that each of the plurality of light pixels 112 may illuminate within a range of light intensity.

The external sensors 120 are disposed on the exterior of the vehicle 100 and on the front side of the vehicle 100. The external sensors 120 may be one or more of LiDAR sensors, radar sensors, ultrasonic sensors, and/or any other sensors capable of: (1) detecting an object; (2) determining a range between the vehicle and the detected object; and (3) determining the position of the detected object with respect to the vehicle 100. It should be appreciated that the position of the detected object with respect to the vehicle 100 may be determined by using a trilateration method or a triangulation method based on readings from the plurality of external sensors 120.

The external camera 130 is also disposed on the exterior of the vehicle 100 and on the front side of the vehicle 100. The external camera 130 may be a night vision camera. In some examples, one or more external cameras 130 may be disposed on the front side of the vehicle 100. By using image analysis techniques, images captured by the external camera 130 may be used to determine the distance and the positon of an object with respect to the vehicle 100.

The internal camera 140 is disposed in the cabin of the vehicle 100 to face the driver side.

The infotainment head unit 150 provides an interface between the vehicle 100 and a user. The infotainment head unit 150 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display etc.), and/or speakers. In the illustrated example, the infotainment head unit 150 includes hardware (e.g., a processor or controller; memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 150 displays the infotainment system on, for example, the center console display.

The on-board computing platform 160 includes a processor or controller 170 and memory 180. In the illustrated example, the on-board computing platform 160 is structured to include a high beam controller 172. Alternatively in some examples, the high beam controller 172. may be incorporated into another electronic control unit (ECU) with its own processor and memory. The processor or controller 170 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 180 may be volatile memory (e.g., RAM, which can include non-volatile RAM, magnetic RAM, ferroelectric RAM, and any other suitable forms); non-volatile memory (e.g., disk memory FLASH memory, EPROMs, EEPROMs, non-volatile solid-state memory etc.), unalterable memory (e.g., EPROMs), read-only memory and/or high-capacity storage devices (e.g., hard drives, solid state drives, etc). In some examples, the memory 180 includes multiple kinds of memory, particularly volatile memory and non-volatile memory.

The memory 180 is computer readable media on which one or more sets of instructions, such as the software for operating the methods of the present disclosure can be embedded. The instructions may embody one or more of the methods or logic as described herein. In a particular embodiment, the instructions may reside completely or at least partially, within any one or more of the memory 180, the computer readable medium, and/or within the processor 170 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Operations of the high beam controller 172 with respect to the overall dynamic high beam control system will be described in detail below.

At the outset, it is assumed that the vehicle 100 is in motion, and the high beam head lamps, the external sensors 120, the external camera 130, and the internal camera 140 are activated.

While the vehicle 100 is traversing a driving path, the high beam controller 172 uses the external sensors 120 and/or the external camera 130 to detect any objects within a high beam zone. The high beam zone is defined by an area in which the high beams are projected. If an object is detected within the high beam zone, the high beam controller 172 determines whether the detected is a person. To determine whether an object detected by the external sensors 120 is a person, the high beam controller 172 may compare readings from the external sensors 120 to a pre-stored data. For example, the high beam controller 172 may determine whether said reading indicating a size and shape of the detected object corresponds to that of a model representing a person. Further, to determine whether an objected detected by the external camera 130 is a person, the high beam controller 172 may perform image analysis techniques on one or more images captured by the external camera 130.

Once the high beam controller 172 determines that the detected object is a person, the high beam controller 172 uses the internal camera 140 to determine whether a driver of the vehicle is distracted from driving. If the driver is distracted, the high beam controller 172 causes the infotainment head unit 150 to issue a visual and/or audible alert to the driver. It should be appreciated that the vehicle 100 may further include other subsystems for determining whether the driver is distracted. For example, other subsystems may include a steering system (not illustrated) for determining whether the vehicle 100 is swerving from the road, a wireless device detection system (not illustrated) for determining whether a mobile device is being used within the area around the driver's seat, etc.

The high beam controller 172 further determines a direction in which the person is facing. For example, using one or more images captured by the external camera 130, the high beam controller 172 may perform an image analysis technique to identity the face of the person and the heading of the person. In some examples, the high beam controller 172 may fail to identity the face of the person (e.g., the face is obscured, environmental factors, etc.), thus, failing to determine the heading of the person. In such examples, the high beam controller 172 may perform a heading algorithm to determine whether the person is facing the vehicle. The heading algorithm uses a plurality of images captured over a predetermined period and/or a plurality of readings measured by the external sensors 120 over the predetermined period to determine a direction in which the person is facing. Using said images and/or readings, the heading algorithm determines a direction in which the person is facing. Specifically using said images and/or readings, the heading algorithm determines a positional difference between the vehicle 100 and person over time by determining a relative gap G between the vehicle 100 and person by implementing various mathematical models including, but not limited to, a discrete function, a sound based method, a light reflection method, and a relative integrator approach.

For the discrete derivation, the heading algorithm determines: (1) a first vehicle speed V1 at a first time T1; (2) a first distance between the vehicle 100 and the person S1 at the first time T1; (3) a second vehicle speed V2 at a second subsequent time T2; and (4) a second distance between the vehicle 100 100 and the person S2 at the second time T2. The amount of time between the first time S1 and the second time S2 may be predetermined. Based on these variables, the heading algorithm determines a time difference $\Delta t$, which is modeled by the following equation:

$$\Delta t = T2 - T1 \qquad \text{[Equation 1]}$$

Based on Equation 1, the heading algorithm determines a discrete function $\Delta S_{vehicle}$ to determine the travel distance within a predetermined period. The discrete function $\Delta S_{vehicle}$ is determined, which is modeled by the following equation:

$$\Delta S_{vehicle} = ((V1+V2)/2) * \Delta t \qquad \text{[Equation 2]}$$

Based at least in part on Equation 2, the heading algorithm further calculates a relative distance between the vehicle 100 and the person, or a relative gap G. For this variable, the heading algorithm assumes that the speed of the person is 0 m/s. The relative gap G is determined based on the following equation:

$$G = S1 - \Delta S_{vehicle} \qquad \text{[Equation 3]}$$

If the second distance S2 between the vehicle 100 and the person is less than or equal to the relative gap G, the heading algorithm determines that the person is approaching the vehicle 100, thus, facing the vehicle 100. If the second distance S2 between the vehicle 100 and the person is greater than the relative gap G, the heading algorithm determines that the person is moving in the same direction as the vehicle 100, thus, not facing the vehicle 100.

For the sound based method, it is assumed that at least one of the external sensors 120 is a sound based sensor for determining a distance between an object and said sensor. Once a sound wave is generated by the external sensors 120, the heading algorithm determines a speed of the sound wave in aft. Based on said speed, the heading algorithm determines a distance traversed by the sound wave $S_{sound}$, which is modeled by the following equation:

$$S_{sound} = V_{sound\ in\ air} \times time \qquad \text{[Equation 4]}$$

Based on said distance, the heading algorithm determines a distance between the vehicle 100 and the person $\Delta S_{car,person}$, which is modeled by the following equation:

$$\Delta S_{car,person} = 0.5 \times S_{sound} \qquad \text{[Equation 5]}$$

The heading algorithm determines a distance between the vehicle 100 and the person $\Delta S_{car,person}$ for a first time T1 and a second subsequent time T2, and determines the relative gap G, which is modeled by the following equation:

$$G = \Delta S_{car,person}(T1) - \Delta S_{car,person}(T2). \qquad \text{[Equation 6]}$$

If the distance between the vehicle 100 and the person $\Delta S_{car}$, person at T2 (i.e. $\Delta S_{car,person}$ (T2)) is less than or equal to the relative gap G, the heading algorithm determines that the person is approaching the vehicle 100, thus, facing the vehicle 100. If $\Delta S_{car,person}$ (T2) is greater than the relative gap G, the heading algorithm determines that the person is moving in the same direction as the vehicle 100, thus, not facing the vehicle 100.

For the light reflection method, this method may be substantially similar to that of the sound based method, wherein the only difference is that the measurement is based on light instead of sound. Therefore, details thereof will not be described herein for sake of brevity.

For the relative integrator approach, it is assumed that at least one of the external sensors 120 is an accelerometer. The heading algorithm determines a first distance S1 at a first time T1 and a second distance at a second subsequent time T2 based on the following equations:

$$S1 = \int\int accelerometer\ output(T1) \qquad \text{[Equation 7]}$$

$$S2 = \int\int accelerometer\ output(T2) \qquad \text{[Equation 8]}$$

Based on the first distance S1 and the second distance S2, the heading algorithm determines the relative gap G, which is modeled by the following equation:

$$G = S1 - S2. \qquad \text{[Equation 9]}$$

if the second distance S2 between the vehicle 100 and the person is less than or equal to the relative gap G, the heading algorithm determines that the person is approaching the vehicle 100, thus, facing the vehicle 100. If the second distance S2 between the vehicle 100 and the person is greater than the relative gap G, the heading algorithm determines that the person is moving in the same direction as the vehicle 100, thus, not facing the vehicle 100.

It should be appreciated that other methods may be used to determine whether a person is facing the vehicle 100.

Moving on, if the high beam controller 172 determines that the person is not facing the vehicle 100, the high beam controller 172 maintains control of the high beam headlamps 110 under normal operations. If the high beam controller 172 determines that the person is facing the vehicle 100, the high beam controller 172 performs an anti-glare light dynamic control.

During the anti-glare light dynamic control, the high beam controller 172 determines the positon of the person's face based on one or more images captured by the external camera 130. If the high beam controller 172 fails to identity the person's face to determine the position thereof, the high beam controller 172 calculates the overall height of the person and estimates a general region in which the person's face should be positioned. Based on the position of the person's face, the high beam controller 172 dynamically adjusts at least one of the plurality of light pixels 112 such that one or more portions of the high beams that would be directed to the person's face is deactivated. In some examples, the high beam controller 172 may dynamically adjust at least one of the plurality of light pixels 112 based on a prediction. For example, the high beam controller 172 may account for an average amount of delay for: (1) capturing an image of a person; (2) identifying the face of the person; and (3) deactivating at least one of the plurality of light pixels 112 directed to the person's face. Based on the average amount of delay, the velocity of the person, and the velocity of the vehicle, the high beam controller 172 may predict a position in which the person will be after the average amount of delay and deactivate at least one of the plurality of light pixels 112 directed to said position.

The high beam controller 172 continues to dynamically adjust at least one of the plurality of light pixels 112 until the person's face is outside the high beam zone.

It should be appreciated that the high beam controller 172 may adjust one or more portions of the high beams for each of the plurality of faces of persons detected within the high beam zone.

It should be appreciated that the dynamic high beam control system may provide the anti-glare light dynamic control to other living beings, such as animals.

Figure 2A:
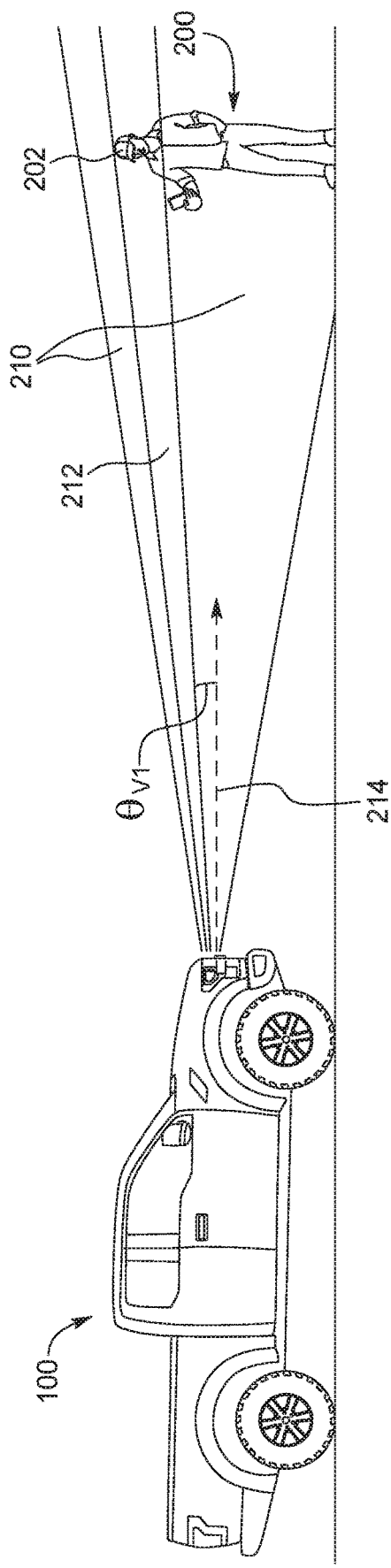
FIGS. 2A and 2B illustrate a side view of example scenarios in which the vehicle of FIG. 1 is approaching a pedestrian.
Figure 2B:
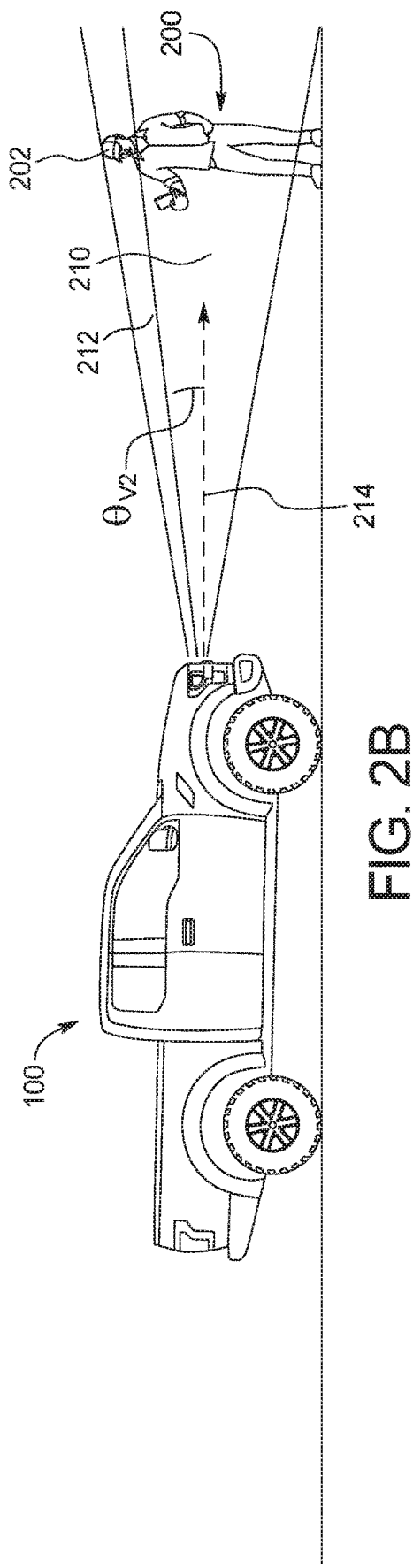

FIGS. 2A and 2B illustrate a side view of example scenarios in which the vehicle 100 of FIG. 1 is approaching a pedestrian 200. In these example scenarios, the vehicle 100 performs the anti-glare light dynamic control such that one or more portions of the high beams 210 that would be directed to the pedestrian's face is deactivated.

In FIG. 2A illustrates a first example scenario. In this scenario, the vehicle 100 and the pedestrian are separated at a first distance. Based on the position of the pedestrian's face 202, the vehicle 100 generates the high beams 210 such that one or more portions 212 of the high beams 210 that is absent of light is positioned at a first vertical angle $\theta_{V1}$ with respect to a reference line 214. Herein, the reference line 214 is parallel to a direction in which the vehicle 100 is traversing.

In FIG. 2B illustrates a second example scenario. In this scenario, the vehicle 100 has moved closer to the pedestrian 200, and the vehicle 100 and the pedestrian 200 are separated at a second closer distance. Based on the position of the pedestrian's face 202, the vehicle 100 generates the high beams 210 such that one or more portions 212 of the high beams 210 that is absent of light is positioned at a second greater vertical angle $\theta_{V2}$ with respect to the reference line 214.

FIGS. 3A and 3B illustrate a plan view of the example scenarios as illustrated in FIGS. 2A and 2B, respectively.

In FIG. 3A, the pedestrian's face 202 is within both the left high beam and the right high beam. Thus, the vehicle 100 causes at least one of the light pixels 112 of the left high beam headlamp 110 to be deactivated such that the left high beam 210 includes a first portion 310 that is: (1) absent of light; and (2) positioned at a first horizontal angle $\theta_{H1}$ with respect to the reference line 214. The first portion 310 is one of the one or more portions 212. Further, the vehicle 100 causes at least one of the light pixels 112 of the right high beam headlamp 210 to be deactivated such that the right high beam 210 includes a second portion 320 that is: (1) absent of light; and (2) positioned at a second greater horizontal angle $\theta_{H2}$ with respect to the reference line 214. The second portion 320 is one of the one or more portions 212

In FIG. 3B, the pedestrian's face 200 is only within the left high beam 210. Thus, the vehicle 100 only causes at least one of the light pixels 112 of the left high beam headlamp 112 to be deactivated such that the first portion 310 absent of light is positioned at a third horizontal angle $\theta_{H3}$ with respect to the reference line 214. Assuming that the pedestrian 200 was stationary and the driving path of the vehicle 100 was linear for both the first example scenario and the second example scenario, the third horizontal angle $\theta_{H3}$ is greater than the first horizontal angle $\theta_{H1}$.

Figure 4:
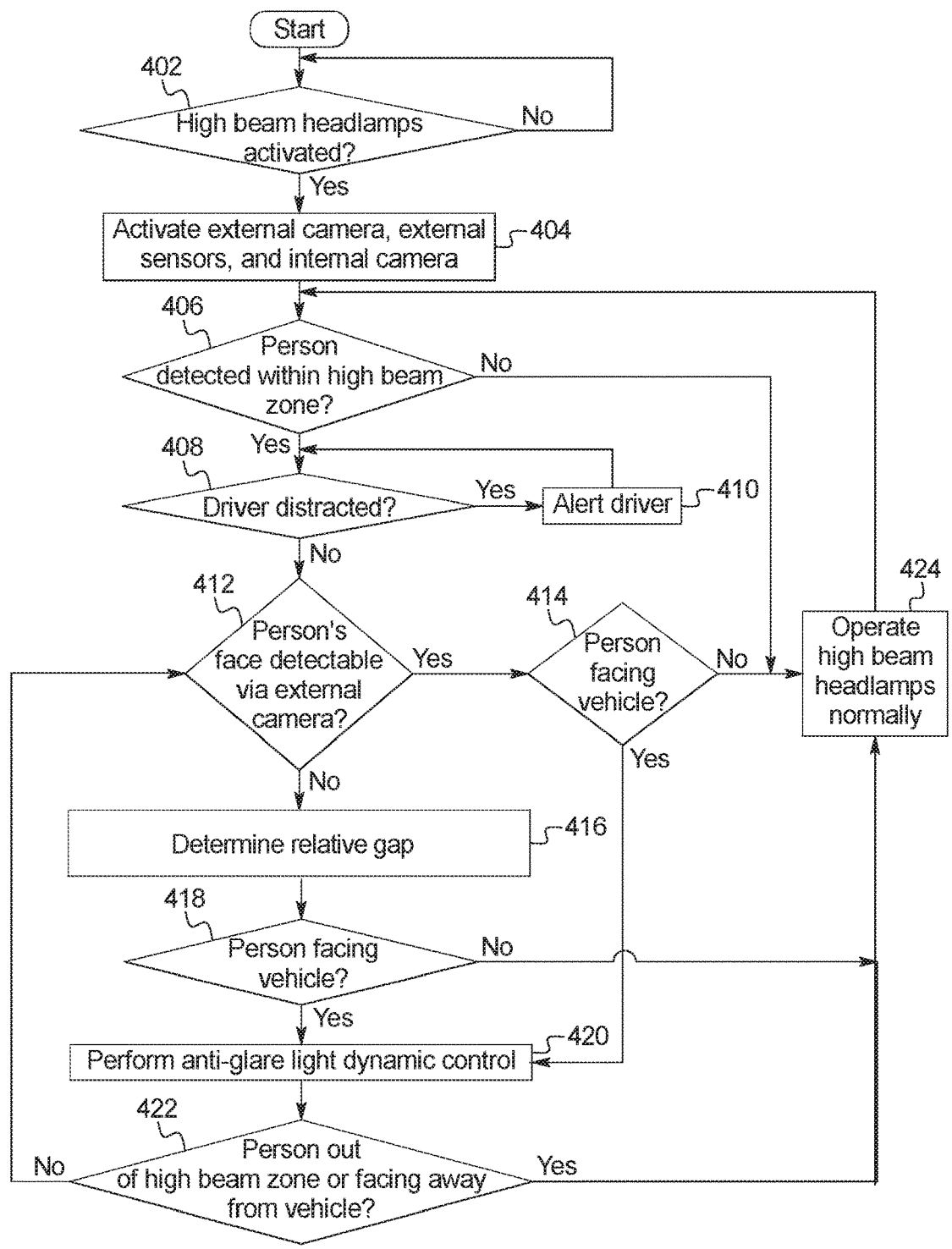
FIG. 4 is a flowchart of a method for dynamically controlling high beams generated from the vehicle of FIG. 1

FIG. 4 is a flowchart of a method for dynamically controlling high beams generated from the vehicle 100 of FIG. 1, which may be implemented by the high beam controller 172 of FIG. 1.

At block 402, the high beam controller 172 determines whether the high beam headlamps 110 are activated. If so, the method continues to block 404. Otherwise, the method returns to block 402.

At block 404, the high beam controller 172 activates external camera 130, the external sensors 120, and the internal camera 140s.

At block 406, the high beam controller 172 determines whether a person is detected within a high beam zone. If so, the method continues to block 408. Otherwise, the method continues to block 424.

At block 408, the high beam controller 172 determines whether the driver of the vehicle 100 is distracted.

At block 410, the high beam controller 172 causes the infotainment head unit 150 to generate a visual and/or audible alert to the driver.

At block 412, the high beam controller 172 determines whether the person's face is detectable from one or more images captured by the external camera 130. If so, the method continues to block 414, Otherwise, the method continues to block 416.

At block 414, the high beam controller 172 determines, based on said one or more images, whether the person is facing the vehicle 100. If so, the method continues to block 420. Otherwise, the method continues to block 424.

At block 416, the high beam controller 172 determines the relative gap G by implementing various mathematical models including, but not limited to, a discrete function, a sound based method, a light reflection method, and a relative integrator approach.

At block 418, the high beam controller 172 compares the relative gap G to a threshold value to determine whether the person is facing the vehicle 100. If the relative gap G satisfies a threshold value, the method continues to block 420. Otherwise, the method continues to block 424.

At block 420, the high beam controller 172 performs the anti-glare light dynamic control.

At block 422, the high beam controller 172 determines whether the person is out of the high beam zone or facing away from the vehicle 100. If so, the method continues to block 424. Otherwise, the method returns to block 412.

At block 424, the high beam headlamps 110 operate normally.

The flowchart of FIG. 4 is representative of machine readable instructions stored in memory (such as the memory of FIG. 1) that comprise one or more programs that, when executed by a processor (such as the processor of 1), cause the vehicle 100 to implement the example high beam controller 172 of FIG. 1. Further, although the example program(s) is/are described with reference to the flowchart illustrated in FIG. 4, many other methods of implementing the example high beam controller 172 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including" and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
sensors;
high beam headlamps comprising light pixels; and
processors configured to:
    determine, via the sensors, a direction in which a person is facing; and, wherein determining, via the sensors, whether the person is facing the vehicle is based at least in part on:
        calculating a positional difference between the person and the vehicle over time; and
        comparing the positional difference to a threshold value; and
    responsive to determining that the person is facing the vehicle:
        determine, via the sensors, a position of the person's face; and
        based on the position, adjust at least one of the light pixels projecting light to the person's face.

2. The vehicle of claim 1, wherein the processors are further configured to, responsive to determining that the person is facing the vehicle, deactivate the at least one of the light pixels projecting light to the person's face based on the position.

3. The vehicle of claim 1, wherein the processors are further configured to:
    determine, via the sensors, a first vehicle speed at a first time, a second vehicle speed at a second subsequent time, a first distance between the vehicle and the person at the first time, and a second distance between the vehicle and the person at the second time;
    determine a time difference by subtracting the first time from the second time;
    determine a first value by dividing a sum of the first vehicle speed and the second vehicle speed by two;
    determine a discrete function by multiplying the first value with the time difference;
    determine a relative gap value by subtracting the first distance from the discrete function; and
    responsive to the relative gap value being less than or equal to the second distance, determine that the person is facing the vehicle.

4. The vehicle of claim 3, wherein the processors are further configured to, responsive to the relative gap value being greater than the second distance, cause all of the light pixels to be activated.

5. The vehicle of claim 1, wherein the processors are further configured to, responsive to determining that the person is facing away from the vehicle, cause all of the light pixels to be activated.

6. The vehicle of claim 1, further comprising: an internal camera; and an infotainment head unit, wherein the processors are further configured to determine, via the internal camera, whether a driver of the vehicle is distracted prior to determining the direction in which the person is facing; and
    responsive to determining that the driver is distracted, cause the infotainment head unit to generate an alert.

7. The vehicle of claim 1, wherein the processors are further configured to:
    define a zone in which high beams are projected; and
    responsive to determining, via the sensors, that the person is within the zone, determine, via the sensors, the direction in which the person is facing.

8. The vehicle of claim 7, wherein the processors are further configured to, responsive to determining, via the sensors, that the person is outside the zone, cause all of the light pixels to be activated.

9. The vehicle of claim 1, further comprising an external camera, wherein the processors are further configured to:
    determine, via the external camera, the direction in which the person is facing; and
    responsive to failing to detect, via the external camera, the direction in which the person is facing, cause the sensors to determine the direction in which the person is facing.

10. The vehicle of claim 1, wherein the processors are further configured to: determine a direction in which the person is advancing; and responsive to determining that the person is advancing towards a direction in which the vehicle is moving, activate the light pixels without adjusting any of the light pixels.

11. The vehicle of claim 1, wherein, to calculate the positional difference, the processors: determine, via the sensors, a first vehicle speed at a first time, a second vehicle speed at a second subsequent time, a first distance between the vehicle and the person at the first time, and a second distance between the vehicle and the person at the second time; determine a time difference by subtracting the first time from the second time; determine a first value by dividing a sum of the first vehicle speed and the second vehicle speed by two; determine a discrete function by multiplying the first value with the time differences; and determine a relative gap value by subtracting the first distance from the discrete function, wherein, to compare the positional difference to the threshold value, the processors determine whether the relative gap value is less than or equal to the second distance, wherein the processors are further configured to determine that the person is facing the vehicle in response to determining that the relative gap value is less than or equal to the second distance, wherein the processors are further configured to determine that the person is facing away from the vehicle in response to determining that the relative gap value is greater than the second distance, and wherein the processors are further configured to, responsive to the relative gap value being greater than the second distance, cause all of the light pixels to be activated.

12. A method of controlling high beams generated from a vehicle, the method comprising: wherein determining, via sensors, a direction in which a person is facing, comprises: determining, via the sensors, a first vehicle speed at a first time, a second vehicle speed at a second subsequent time, a first distance between the vehicle and the person at the first time, and a second distance between the vehicle and the person at the second time; determining a time difference by subtracting the first time from the second time; determining a first value by dividing a sum of the first vehicle speed and the second vehicle speed by two; determining a discrete function by multiplying the first value with the time difference; determining a relative gap value by subtracting the first distance from the discrete function; responsive to the relative gap value being less than or equal to the second distance, determining that the person is facing the vehicle; and responsive to determining that the person is facing the vehicle: determining, via the sensors, a position of the person's face; and based on the position, adjusting at least one of light pixels of high beam headlamps projecting light to the person's face.

13. The method of claim 12, further comprising: responsive to determining that the person is facing the vehicle, deactivating the at least one of the light pixels projecting light to the person's face based on the position.

14. The method of claim 12, further comprising, responsive to the relative gap value being greater than second distance, causing all of the light pixels to be activated.

15. The method of claim 12, further comprising, responsive to determining that the person is facing away from the vehicle, causing all of the light pixels to be activated.

16. The method of claim 12, further comprising:
determining, via an internal camera of the vehicle, whether a driver of the vehicle is distracted prior to determining the direction in which the person is facing; and
responsive to determining that the driver is distracted, causing an infotainment head unit of the vehicle to generate an alert.

17. The method of claim 12, further comprising:
defining a zone in which high beams are projected; and
responsive to determining, via the sensors, that the person is within the zone, determining, via the sensors, the direction in which the person is facing.

18. The method of claim 17, further comprising, responsive to determining, via the sensors, that the person is outside the zone, causing all of the light pixels to be activated.

19. The method of claim 12, further comprising:
determining, via an external camera of the vehicle, the direction in which the person is facing; and
responsive to failing to detect, via the external camera, the direction in which the person is facing, causing the sensors to determine the direction in which the person is facing.

20. The method of claim 12, further comprising: determining a direction in which the person is advancing; and responsive to determining that the person is advancing towards a direction in which the vehicle is moving, activating the light pixels without adjusting any of the light pixels.

21. The method of claim 12, wherein the determining, via the sensors, whether the person is facing the vehicle is based at least in part by:
calculating a positional difference between the person and the vehicle over time; and
comparing the positional difference to a threshold value.

22. The method of claim 21, wherein the calculating the positional difference comprises:
determining, via the sensors, a first vehicle speed at a first time, a second vehicle speed at a second subsequent time, a first distance between the vehicle and the person at the first time, and a second distance between the vehicle and the person at the second time;
determining a time difference by subtracting the first time from the second time;
determining a first value by dividing a sum of the first vehicle speed and the second vehicle speed by two;
determining a discrete function by multiplying the first value with the time differences; and
determining a relative gap value by subtracting the first distance from the discrete function,
wherein the comparing the positional difference to the threshold value comprises determining whether the relative gap value is less than or equal to the second distance, and
wherein the method further comprises:
determining that the person is facing the vehicle in response to determining that the relative gap value is less than or equal to the second distance,
determining that the person is facing away from the vehicle in response to determining that the relative gap value is greater than the second distance, and
responsive to the relative gap value being greater than the second distance, cause all of the light pixels to be activated.

* * * * *